(12) United States Patent
Densham

(10) Patent No.: US 7,800,510 B2
(45) Date of Patent: *Sep. 21, 2010

(54) BATTERY SYSTEMS WITH EMBEDDED CELL MONITORS

(75) Inventor: William Densham, Los Gatos, CA (US)

(73) Assignee: O2Micro, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/291,571

(22) Filed: Nov. 12, 2008

(65) Prior Publication Data

US 2009/0140870 A1 Jun. 4, 2009

Related U.S. Application Data

(63) Continuation-in-part of application No. 11/998,579, filed on Nov. 30, 2007, now Pat. No. 7,755,500.

(51) Int. Cl.
*G08B 21/00* (2006.01)

(52) U.S. Cl. .................. 340/636.1; 340/636.18; 340/636.19; 340/636.12; 340/636.15; 320/136

(58) Field of Classification Search .............. None
See application file for complete search history.

(56) References Cited

U.S. PATENT DOCUMENTS

| | | | | | |
|---|---|---|---|---|---|
| 4,931,947 | A | * | 6/1990 | Werth et al. | 700/297 |
| 5,349,282 | A | * | 9/1994 | McClure | 320/136 |
| 5,622,789 | A | * | 4/1997 | Young | 429/7 |
| 5,717,937 | A | * | 2/1998 | Fritz | 713/300 |
| 6,118,248 | A | * | 9/2000 | Gartstein et al. | 320/107 |
| 2004/0070371 | A1 | * | 4/2004 | Chern et al. | 320/136 |
| 2004/0192407 | A1 | * | 9/2004 | Formenti | 455/572 |
| 2007/0080662 | A1 | * | 4/2007 | Wu | 320/110 |
| 2007/0212596 | A1 | * | 9/2007 | Nebrigic et al. | 429/61 |
| 2008/0309284 | A1 | * | 12/2008 | Choksi et al. | 320/106 |
| 2009/0015208 | A1 | * | 1/2009 | White et al. | 320/150 |

* cited by examiner

*Primary Examiner*—Julie Lieu

(57) ABSTRACT

A battery pack is disclosed. The battery pack includes a battery cell and an RF cell monitor. The RF cell monitor is embedded in the battery cell and is operable for monitoring the battery cell and for generating an alert signal indicative of a predetermined condition of the battery cell.

18 Claims, 13 Drawing Sheets

BATTERY SYSTEMS WITH EMBEDDED CELL MONITORS

RELATED APPLICATION

This application is a continuation-in-part application of U.S. application Ser. No. 11/998,579, titled Battery System with Embedded Cell Monitors, filed on Nov. 30, 2007 now U.S. Pat. No. 7,755,500, which is hereby incorporated by reference in its entirety.

TECHNICAL FIELD

Embodiments in accordance with the present invention relate to power systems and battery monitoring systems.

BACKGROUND

Batteries are widely used in electronic devices for providing power to electronic devices, such as notebook computers, mobile phones, etc. However, temperature of a battery can rise when the battery is in charging or discharging. Lithium-ion batteries, especially cobalt cathode chemistry type batteries can reach a critical temperature (e.g., between 135 degrees Celsius and 145 degrees Celsius) when exothermic reaction becomes self-sustaining. High temperature can deteriorate batteries.

In a conventional electronic system, a thermistor can be employed to monitor a temperature of the battery pack. However, the thermistor cannot respond quickly to a high temperature of a battery cell that is located far from the thermistor.

SUMMARY

A battery pack is disclosed herein. The battery pack includes a battery cell and an RF cell monitor. The RF cell monitor is embedded in the battery cell and is operable for monitoring the battery cell and for generating an alert signal indicative of a predetermined condition of the battery cell.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
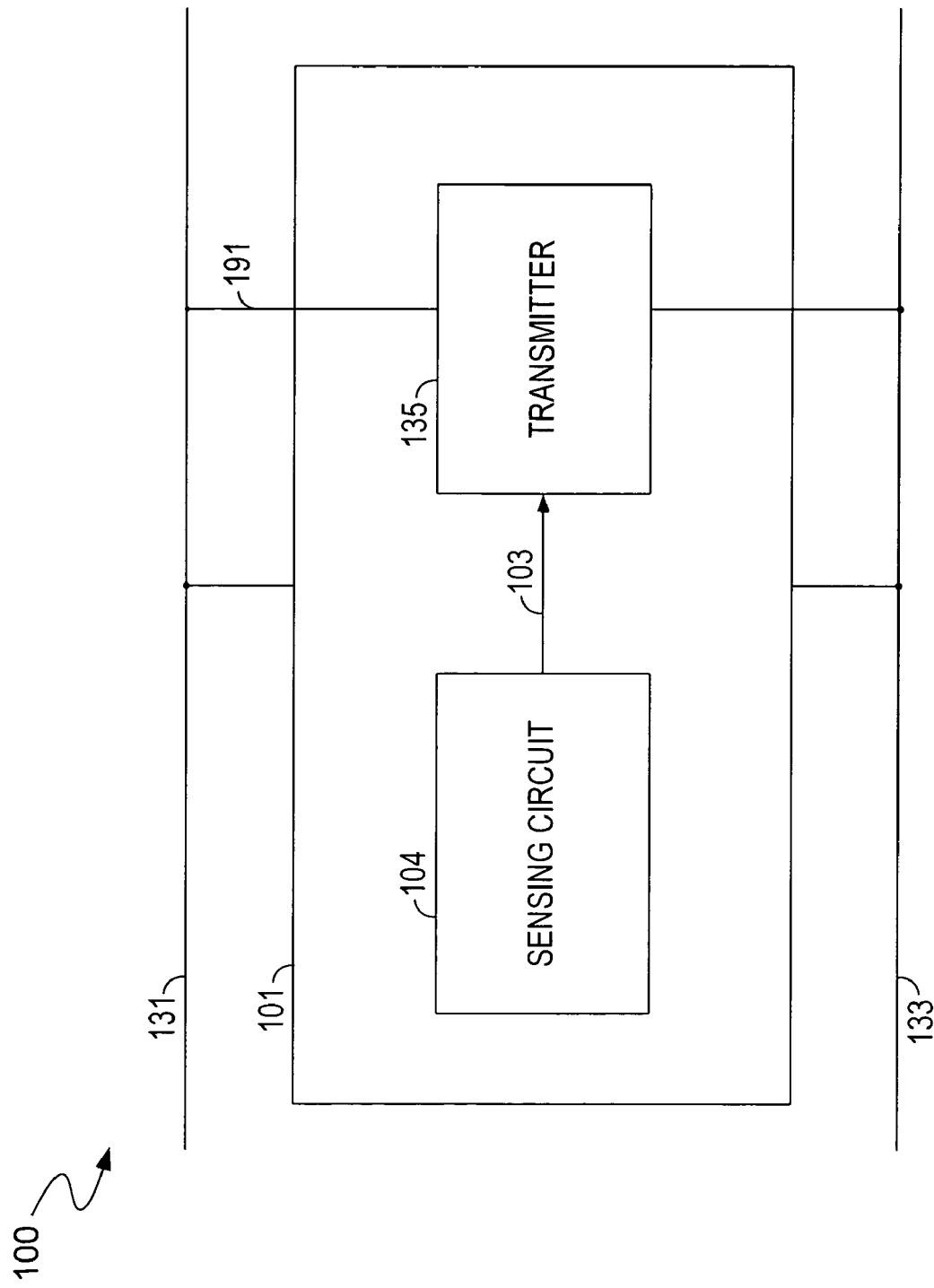
FIG. 1 illustrates a block diagram of a battery cell with an embedded cell monitor, in accordance with one embodiment of the present invention.

Battery packs/systems with embedded cell monitors are disclosed herein in the present disclosure. Since embodiments shown in the drawings are for illustrative purposes, some sub-components and/or peripheral components generally incorporated in the disclosure are omitted herein for brevity and clarity. In describing embodiments in accordance with the present invention, specific terminologies are employed for the sake of clarity. However, the disclosure of this patent specification is not intended to be limited to selected terminologies and specified embodiments. It is understood that each specific element includes all technical equivalents that operate in a similar manner.

In one embodiment, a battery pack including one or more battery cells is provided. A cell monitor (e.g., a radio frequency (RF) cell monitor) is embedded in each battery cell and is operable for monitoring a corresponding battery cell and for generating an alert signal indicative of a predetermined condition (e.g., an undesirable condition, or a fault condition) of the corresponding battery cell. Each RF cell monitor includes a sensing circuit operable for detecting the predetermined condition of the corresponding battery cell and for generating a detecting signal. Each RF cell monitor further includes a transmitter operable for generating the alert signal according to the detecting signal of the RF cell monitor. The battery pack further includes a receiver for receiving the alert signal. The receiver includes a battery management unit for triggering a protection action (e.g., terminating battery pack charging or terminating battery pack discharging) for the battery pack according to the alert signal.

FIG. 1 illustrates a block diagram of a battery cell 100 with an embedded cell monitor 101, in accordance with one embodiment of the present invention. The battery cell 100 is in a battery pack (not shown in FIG. 1 for purposes of brevity and clarity). The cell monitor 101 is embedded in the battery cell 100 and is coupled between a positive terminal 131 and a negative terminal 133 of the battery cell 100. The cell monitor 101 is operable for monitoring the battery cell 100 and for generating an alert signal 191 indicative of a predetermined condition (e.g., an undesirable condition) of the battery cell 100. In one embodiment, the undesirable condition can include, but is not limited to, an over-voltage condition and an over-temperature condition. In one embodiment, the cell monitor 101 includes a sensing circuit 104 operable for detecting an undesirable condition of the battery cell 100 and for generating a detecting signal 103 indicative of the detected undesirable condition. The cell monitor 101 further includes a transmitter 135 operable for receiving the detecting signal 103 and for generating the alert signal 191 according to the detecting signal 103 from the sensing circuit 104. Advantageously, the battery pack can obtain the alert signal 191 and perform a corresponding protection action (e.g., terminating battery pack charging or terminating battery pack discharging) to protect the battery pack from being deteriorated in the undesirable condition.

Figure 2A:
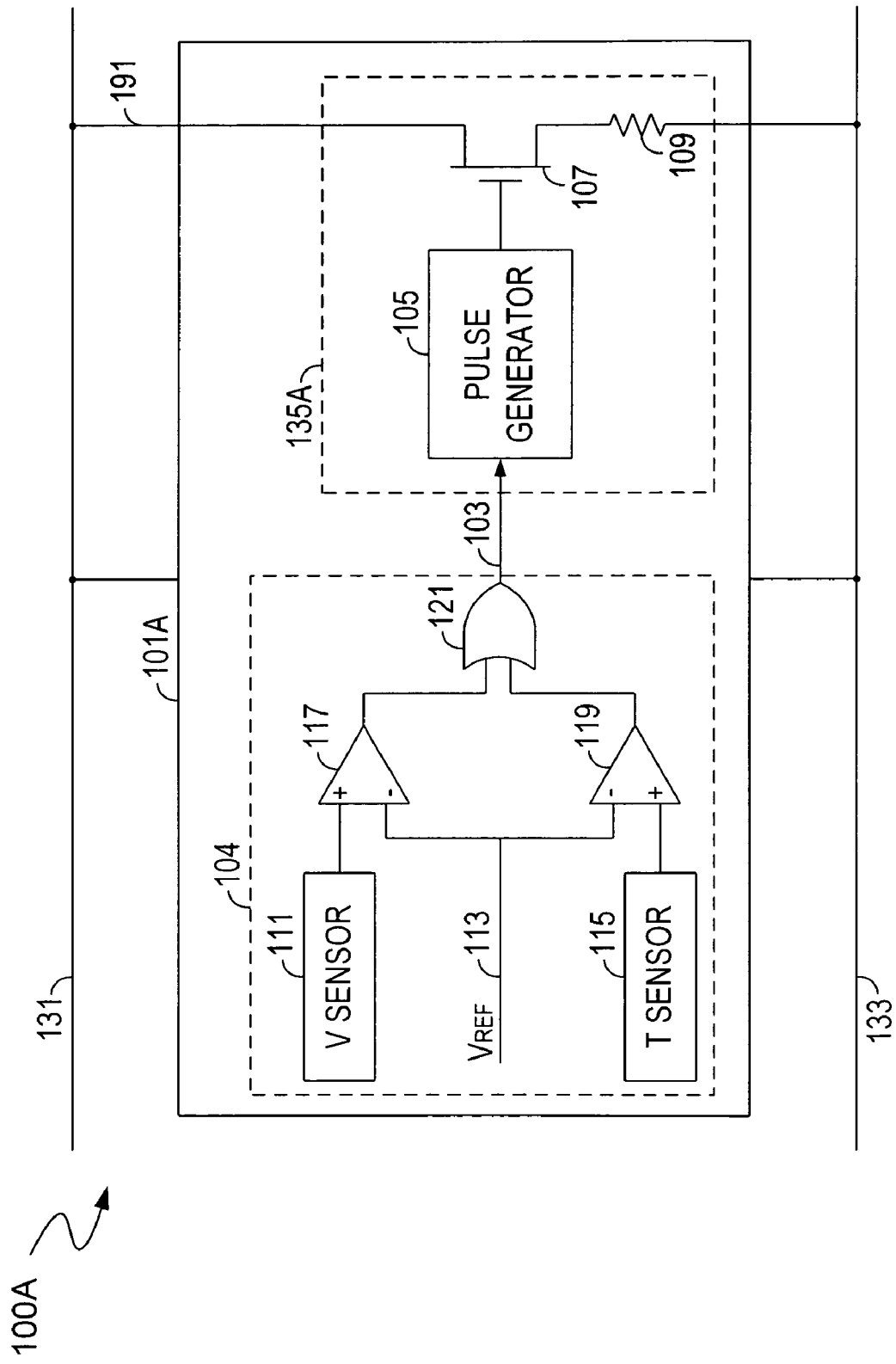
FIG. 2A illustrates a diagram of a battery cell with an embedded cell monitor, in accordance with one embodiment of the present invention.

FIG. 2A illustrates a detailed diagram of a battery cell 100A with an embedded cell monitor 101A, in accordance with one embodiment of the present invention. Elements that are labeled the same as in FIG. 1 have similar functions and hence any repetitive description of these elements is omitted herein for purposes of clarity and brevity. In one embodiment, the sensing circuit 104 is operable for detecting an undesirable condition of the battery cell 100A and for generating a detecting signal 103. The transmitter 135A is operable for generating an alert signal 191 according to the detecting signal 103 from the sensing circuit 104.

More specifically, the sensing circuit 104 can include a voltage sensor 111, a comparator 117, and a logic OR gate 121. In one embodiment, the voltage sensor 111 can be a resistor. The voltage sensor 111 is operable for monitoring a voltage of the battery cell 100A. The voltage monitored by the voltage sensor 111 is compared with a reference voltage 113 by the comparator 117. The reference voltage 113 can be a predetermined threshold voltage. If the voltage of the battery cell 100A is greater than the reference voltage 113, which may indicate an over-voltage condition, the comparator 117 generates a signal (e.g., with a relatively high voltage level) to the logic OR gate 121.

In one embodiment, the sensing circuit 104 also includes a temperature sensor 115 and a comparator 119. In one embodiment, the temperature sensor 115 can be a thermistor. In another embodiment, the temperature sensor 115 can be an internal thermal sensing circuit. The temperature sensor 115 is operable for monitoring a temperature of the battery cell 100A and for generating a signal indicative of the temperature of the battery cell 100A. The signal indicative of the temperature of the battery cell 100A has a voltage level Vt. The voltage level Vt is compared with the reference voltage 113 by the comparator 119. If the voltage level Vt is greater than the reference voltage 113, which may indicate an over-temperature condition, the comparator 119 generates a signal (e.g., with a relatively high voltage level) to the logic OR gate 121.

In one embodiment, the voltage sensor 111 and the temperature sensor 115 continuously monitor the voltage and the temperature of the battery cell 100A respectively. If an undesirable condition (e.g., an over-voltage condition and/or an over-temperature condition) occurs, the logic OR gate 121 can generate a detecting signal 103 (e.g., with a relatively high voltage level) to the transmitter 135A. The transmitter 135A can generate an alert signal 191 to the battery pack according to the detecting signal 103 if the undesirable condition occurs. More specifically, if the voltage of the battery cell 100A is greater than a predetermined threshold and/or if the temperature of the battery cell 100A is greater than a predetermined threshold, the alert signal 191 will be generated. Consequently, corresponding actions can be performed to protect the battery pack.

In one embodiment, the transmitter 135A includes a pulse generator 105, a resistor 109, and a switch 107 (e.g., a transistor) coupled to the pulse generator 105. When the pulse generator 105 receives the detecting signal 103 indicative of the undesirable condition, the pulse generator 105 can generate a series of pulses to the switch 107 according to the detecting signal 103. In one embodiment, the pulse generator 105 can generate a series of relatively high current pulses with a frequency f0 (e.g., a pulse width modulation signal with a duty cycle of 1%) in response to the detecting signal 103. The switch 107 is operable for receiving the series of pulses from the pulse generator 105 and for generating the alert signal 191. In one embodiment, the switch 107 is switched on and off periodically by the pulses. Thus, the alert signal 191 is shown as an AC signal having a frequency f0, in one embodiment. The cell voltage of the battery cell 100A drops when the switch 107 is on. Consequently, the cell voltage between terminals 131 and 133 can be shown as an AC voltage with the frequency f0 in response to the alert signal 191, in one embodiment.

Figure 2B:
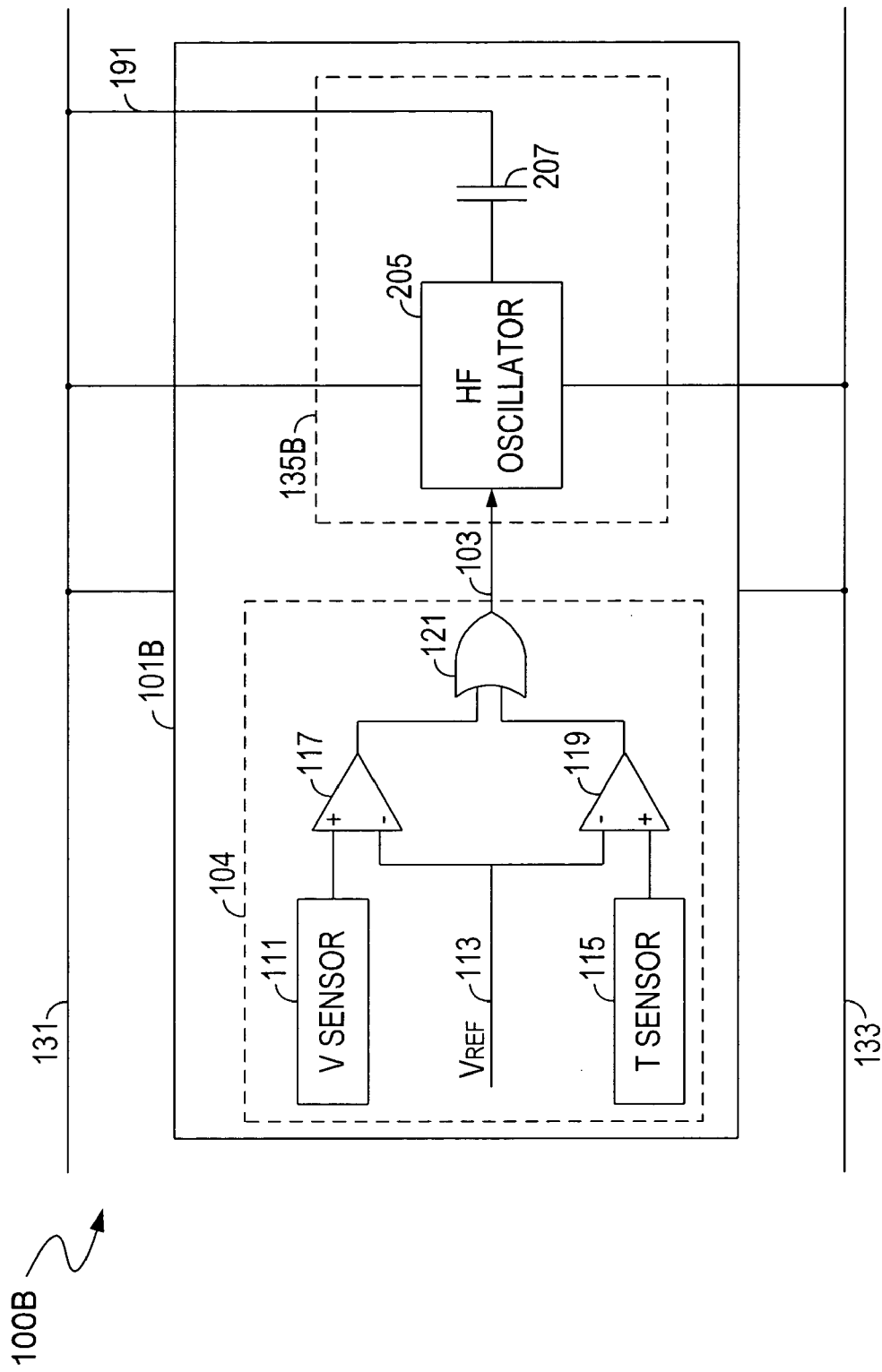
FIG. 2B illustrates a diagram of a battery cell with an embedded cell monitor, in accordance with one embodiment of the present invention.

FIG. 2B illustrates another detailed diagram of a battery cell 100B with an embedded cell monitor 101B, in accordance with one embodiment of the present invention. Elements that are labeled the same as in FIG. 1 and FIG. 2A have similar functions and will not be repetitively described herein for purposes of clarity and brevity. In one embodiment, the cell monitor 101B includes a transmitter 135B for receiving the detection signal 103 and for generating the alert signal 191 according to the detection signal 103. More specifically, the transmitter 135B includes an oscillator 205 and a capacitor 207 coupled to the oscillator 205, in one embodiment. In one embodiment, the oscillator 205 can be a high frequency single tone oscillator. In another embodiment, the oscillator 205 can be a high frequency dual tone oscillator.

The oscillator 205 can receive the detecting signal 103 from the logic OR gate 121. In one embodiment, the oscillator 205 has a frequency fosc and generates an oscillation signal, e.g., a sinusoidal AC waveform having a relatively high frequency fosc (e.g., 10 MHz), as the alert signal 191 according to the detecting signal 103. The capacitor 207 is operable for transferring the alert signal 191 having the frequency fosc to the battery cell 100B. As a result, when the voltage sensor 111 detects an over-voltage condition, and/or the temperature sensor 115 detects an over-temperature condition, the cell voltage of the battery cell 100B can be shown as an AC voltage with the frequency fosc in response to the alert signal 191.

As discussed above in relation to FIG. 2A and FIG. 2B, the alert signal 191 can reflect an undesirable condition of the battery cell 100, e.g., an over-temperature and/or an over-voltage condition. Consequently, an AC voltage can be shown across the battery cell in response to the alert signal 191. Description will now be made with reference to FIG. 3 with respect to detecting such alert signal and performing corresponding actions if an undesirable condition occurs.

Figure 3:
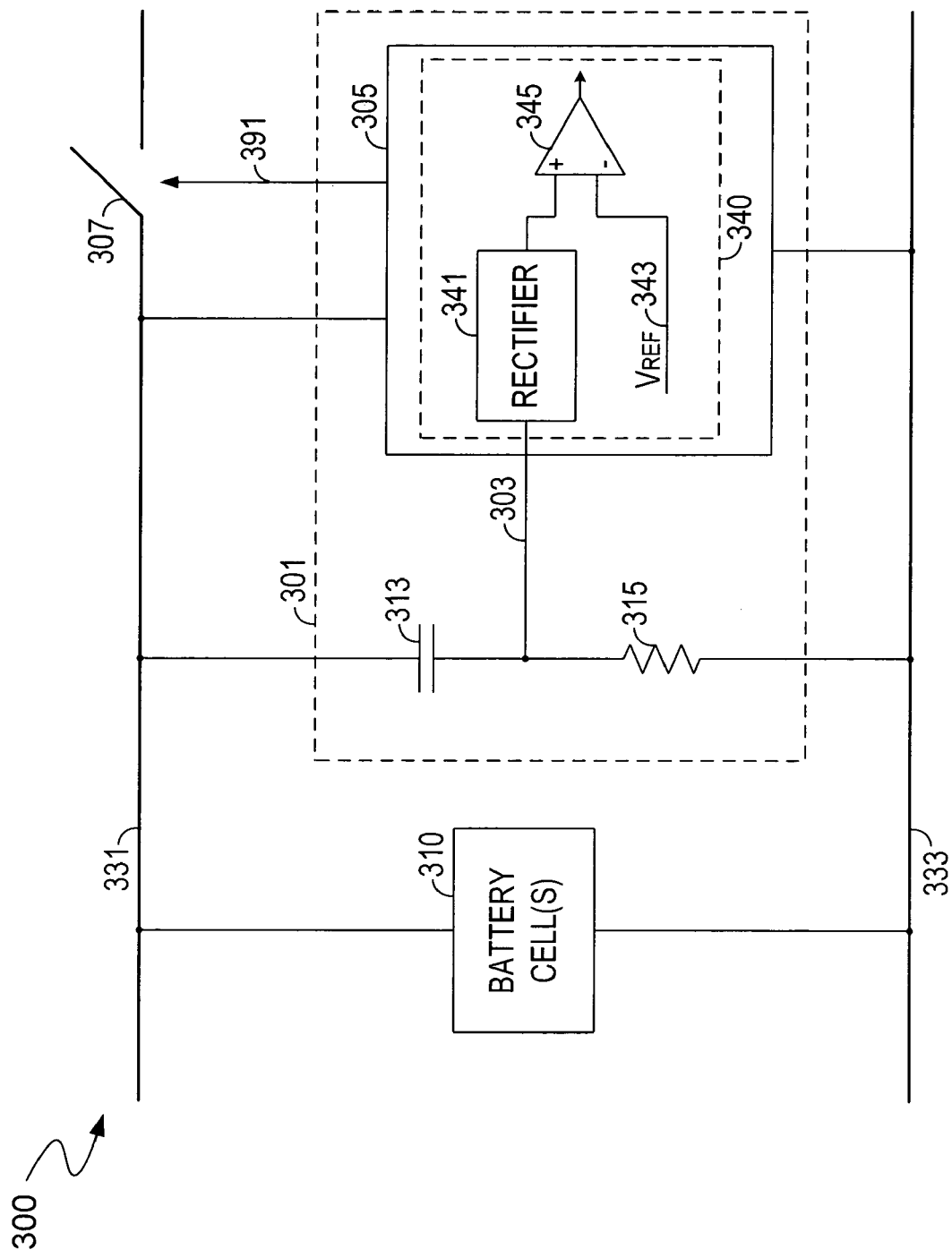
FIG. 3 illustrates a block diagram of a battery system, in accordance with one embodiment of the present invention.

FIG. 3 shows a block diagram of a battery system 300 (e.g., a battery pack), in accordance with one embodiment of the present invention. The battery pack 300 includes one or more battery cells 310 coupled in series or in parallel, each of which can employ the configuration in FIG. 1, in one embodiment. A cell monitor is embedded in each of the battery cells 310. Therefore, the battery cells 310 are monitored by embedded cell monitors individually and respectively. The battery pack 300 further includes a positive terminal 331, a negative terminal 333, a receiver 301, and a switch 307, in one embodiment. The receiver 301 can include a battery management unit 305 for controlling the switch 307, in one embodiment. As described above in relation to FIG. 2A and FIG. 2B, when an undesirable condition (e.g., an over-temperature condition and/or an over-voltage condition) is detected in a battery cell, an AC voltage can be shown across the battery cell in response to the alert signal. Thus, an AC voltage can be shown between the positive terminal 331 and the negative terminal 333 of the battery pack 300, in one embodiment. The receiver 301 is coupled to the positive terminal 331 and the negative terminal 333 of the battery pack 300 and is operable for receiving the alert signal from a cell monitor by detecting an AC voltage between the positive terminal 331 and the negative terminal 333 of the battery pack 300, in one embodiment. A driving signal 303 can be generated according to the alert signal.

In one embodiment, the receiver 301 includes a high-pass filter shown as a capacitor 313 and a resistor 315 coupled in series for filtering noises associated with the battery pack 300. In one embodiment, if the alert signal (e.g., an AC signal) from battery cells 310 has the frequency f0 higher than a cutoff frequency of the high-pass filter, the high-pass filter can generate a driving signal 303. The battery management unit 305 can receive the driving signal 303 from the high-pass filter and generate a switching signal 391 according to the driving signal 303. Corresponding actions can be performed to protect the battery pack 300 in response to the switching signal 391. For example, the switching signal 391 turns off the switch 307 to terminate battery charging/discharging in order to protect the battery pack 300 from deterioration.

In one embodiment, the battery management unit 305 includes a detection circuit 340 for detecting the driving signal 303 from the high-pass filter. Such configuration is for illustrative purpose and other configurations can also be employed in the battery management unit 305. The detection circuit 340 includes a rectifier 341 and a comparator 345, in one embodiment. The rectifier 341 can be a relatively high frequency rectifier for receiving the driving signal 303 and for rectifying the driving signal 303. In one embodiment, the rectifier 341 generates a voltage signal according to the driving signal 303. Then the comparator 345 compares the voltage signal with a reference signal 343. If the voltage level of the voltage signal from the rectifier 341 is greater than the voltage level of the reference signal 343, the comparator 345 outputs a signal (e.g., with a relatively high voltage level) to the battery management unit 305, in one embodiment. Then the battery management unit 305 can generate a switching signal 391 according to a result of the comparison to trigger a protection action for the battery pack 300. For example, the switching signal 391 can turn off the switch 307, which is coupled to the positive terminal 331 of the battery pack 300. Consequently, the battery pack 300 can be disconnected from a load or a charger (not shown in FIG. 3 for purposes of brevity and clarity) and can be protected from being deteriorated in the over-temperature condition and/or over-voltage condition.

Figure 4:
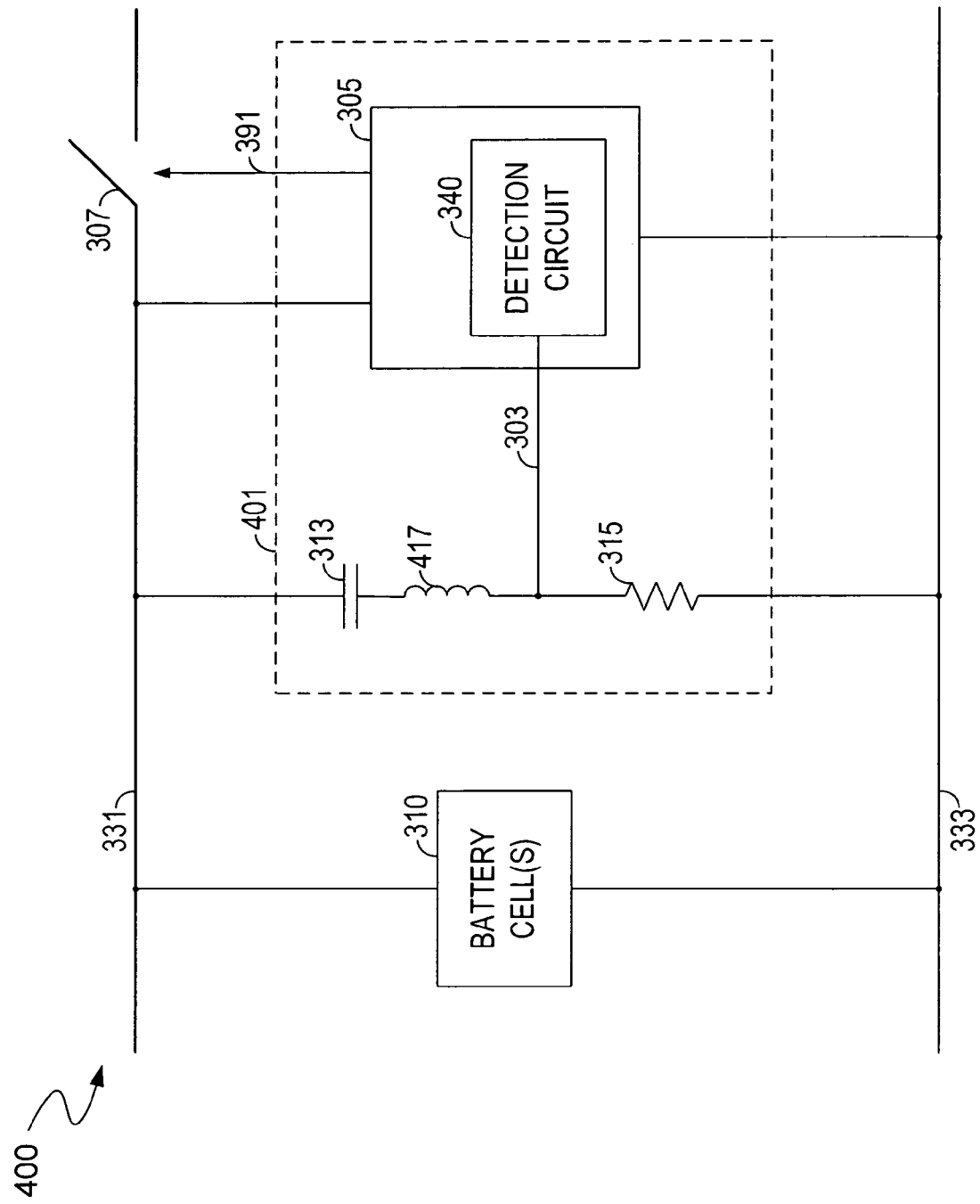
FIG. 4 illustrates a block diagram of a battery system, in accordance with one embodiment of the present invention.

FIG. 4 illustrates a block diagram of a battery system 400 (e.g., a battery pack), in accordance with another embodiment of the present invention. Elements that are labeled the same as in FIG. 3 have similar functions and will not be repetitively described herein for purposes of clarity and brevity. The battery pack 400 includes a receiver 401 similar to the receiver 301 in FIG. 3. The receiver 401 detects the alert signal from battery cells 310 and a driving signal 303 is generated to the battery management unit 305. In one embodiment, the receiver 401 includes a band-pass filter shown as a capacitor 313, an inductor 417 and a resistor 315 in series for filtering noises associated with the battery pack 400. In one embodiment, a resonant frequency of the band-pass filter can be set to be equal to the frequency of the alert signal 191 in FIG. 2A and FIG. 2B. Therefore, the alert signal can pass through the band-pass filter. Thus, the receiver 401 can receive the relatively high frequency alert signal from battery cells 310 and the band-pass filter can generate the driving signal 303. The battery management unit 305 can generate a switching signal 391 according to the driving signal 303. The switching signal 391 can trigger a protection action for the battery pack 400 by controlling the switch 307. For example, the switch 307 can be turned off by the switching signal 391 under the control of the battery management unit 305. Consequently, the battery pack 400 can be disconnected from a load or a charger (not shown in FIG. 4 for purposes of brevity and clarity) and can be protected from being deteriorated in undesirable conditions.

Accordingly, when a predetermined condition (e.g., an over-temperature condition and/or an over-voltage condition) is detected by a cell monitor 101 embedded in a battery cell 100 from battery cells 310, the cell monitor 101 can generate an alert signal. The alert signal can cause an AC voltage across the battery cell 100, in one embodiment. Therefore, an AC voltage can be shown between the positive terminal 331 and the negative terminal 333 of the battery pack 300 (400) in response to the alert signal. Then the receiver 301 (401) can detect the alert signal and the driving signal 303 is generated to the battery management unit 305. The battery management unit 305 can generate a switching signal 391 which can control the switch 307. The switch 307 is turned off under control of battery management unit 305 to protect the battery pack 300 (400) according to the driving signal 303. Advantageously, each cell in battery cells 310 is monitored by an individual embedded cell monitor. If one of the battery cells 310 is undergoing an over-temperature and/or over-voltage condition, the cell monitor in that battery cell can transmit an alert signal to alert the battery pack 300 (400). Consequently, corresponding actions can be performed to protect the battery pack 300 (400) from being deteriorated in undesirable conditions.

As described in FIG. 2B, the transmitter 135B includes the capacitor 207 for transferring the alert signal from the oscillator 205 to the positive terminal 131 of the battery cell 100B. The following description made with reference to FIG. 5 and FIG. 6 describes an exemplary implementation of such capacitor in fabrication process.

Figure 5:
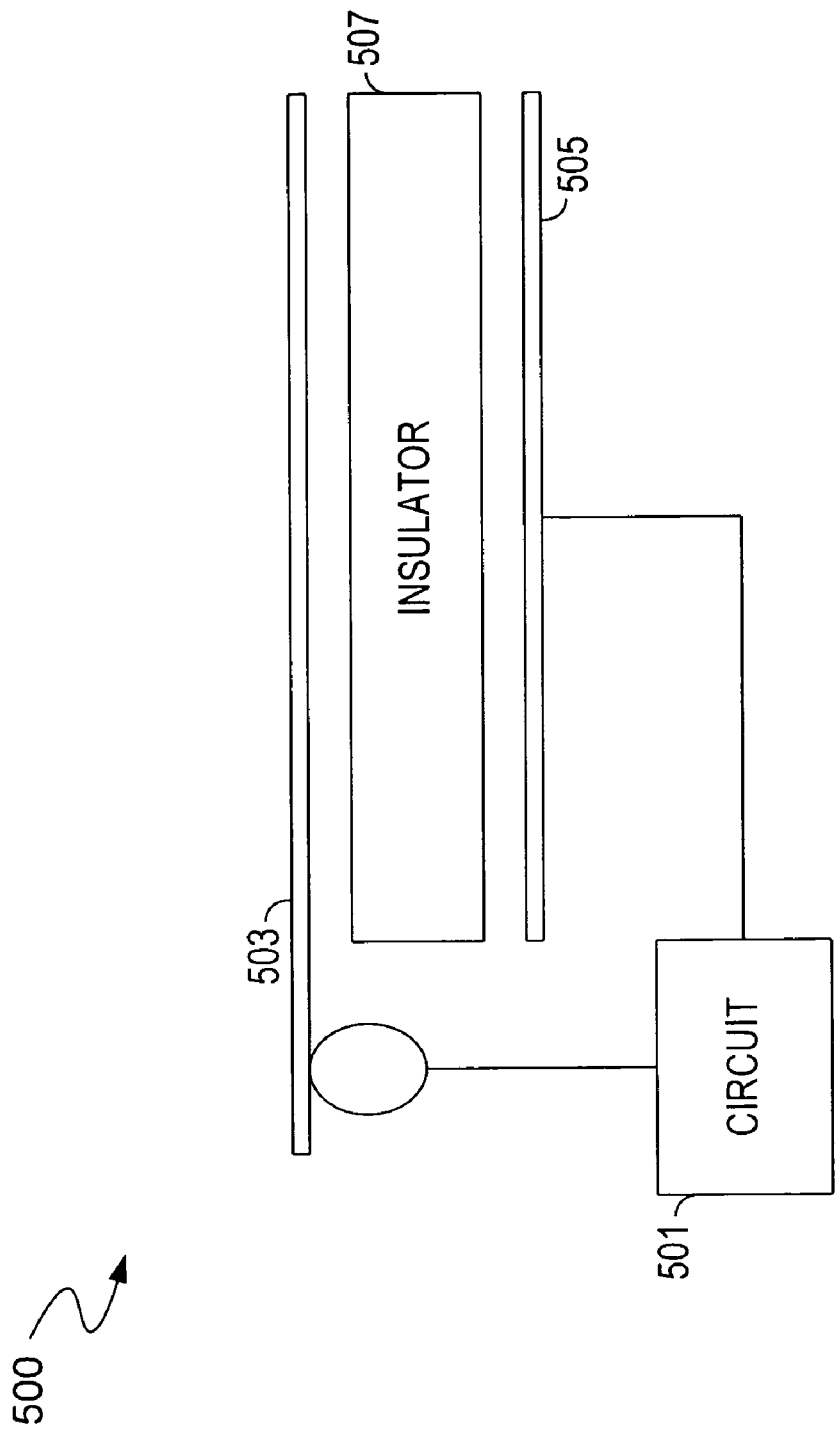
FIG. 5 illustrates a cross-section diagram of a die of an embedded cell monitor, in accordance with one embodiment of the present invention.

FIG. 5 shows a cross-section diagram of a die 500, in which a cell monitor (e.g., the cell monitor 101B in FIG. 2B) is fabricated, in accordance with one embodiment of the present invention. Referring to FIG. 5, the die 500 includes a metal layer 503, a metal layer 505, and an insulator 507. The metal layer 503 and the metal layer 505 are insulated by the insulator 507. A circuit 501 including the sensing circuit 104 and the oscillator 205 in FIG. 2B is coupled to the metal layer 503 and the metal layer 505. During fabrication of the die 500, the metal layer 503 and the metal layer 505 are formed when fabricating the sensing circuit 104 and the oscillator 205. Advantageously, the insulator 507 can be formed between the metal layer 503 and the metal layer 507, and thus the metal layer 503, the insulator 507 and the metal layer 505 can constitute the capacitor 207 with a relatively large capacitance. Therefore, this configuration can avoid the formation of two extra metal layers for the purpose of the capacitor fabrication and the cost of the die 500 can be decreased.

Figure 6:
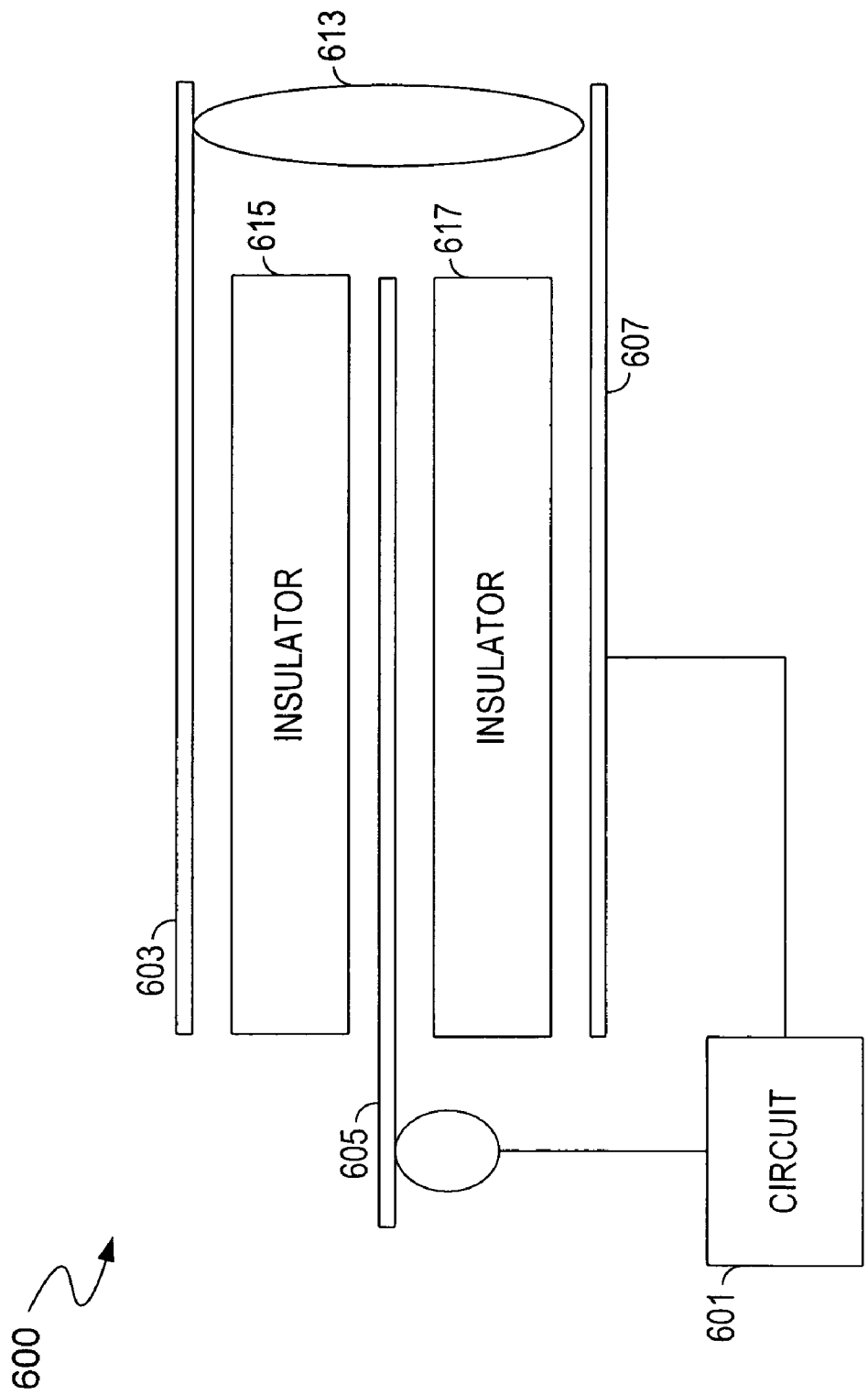
FIG. 6 illustrates a cross-section diagram of a die of an embedded cell monitor, in accordance with one embodiment of the present invention.

FIG. 6 shows another cross-section diagram of a die 600, in which the cell monitor 101B is fabricated, in accordance with one embodiment of the present invention. The die 600 includes multiple metal layers, e.g., a metal layer 603, a metal layer 605, and a metal layer 607. Metal layers are separated by an insulator 615 and an insulator 617. In one embodiment, the metal layer 603 is coupled to the metal layer 607 through a via 613. In one embodiment, a circuit 601 including the sensing circuit 104 and the oscillator 205 in FIG. 2B is coupled to the metal layer 605 and the metal layer 607. During fabrication of the die 600, the metal layer 603, the metal layer 605, and the metal layer 607 are formed when fabricating the sensing circuit 104 and the oscillator 205. Advantageously, multiple metal layers can extend the number of vertical layers of capacitors that can be provided. Therefore, the metal layer 603, the metal layer 605 and the insulator 615 can constitute a first capacitor, the metal layer 605, the metal layer 607 and the insulator 617 can constitute a second capacitor. The first capacitor and the second capacitor are coupled in parallel as shown in FIG. 6. Advantageously, the capacitor 207 can include the first capacitor and second capacitor in parallel. Thus, the capacitance of the parallel connected capacitors in FIG. 6 can be twice as the capacitance of the capacitor in FIG. 5. In one embodiment, extra metal layers are saved to form the capacitor configuration and the cost of the die 600 can be reduced.

Figure 7:
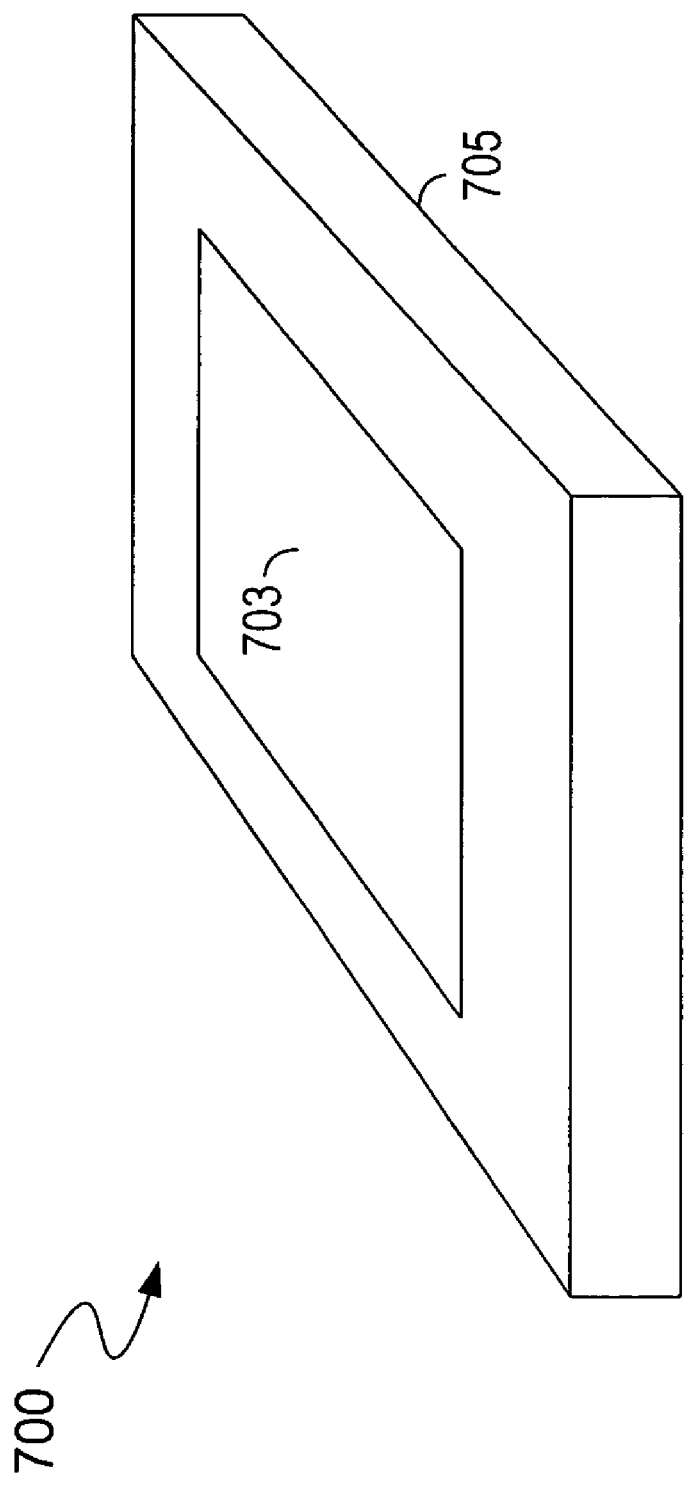
FIG. 7 illustrates a die of an embedded cell monitor, in accordance with one embodiment of the present invention.

FIG. 7 illustrates a cell monitor die 700 of the cell monitor 101, in accordance with one embodiment of the present invention. In one embodiment, the cell monitor 101 is fabricated on the cell monitor die 700. The cell monitor die 700 includes a bottom 705 (e.g., a substrate) and a top 703 (e.g., metal layer 503 in FIG. 5 or metal layer 603 in FIG. 6). Because the bottom 705 is ground, the bottom 705 can be coupled to the negative terminal of the battery cell 100, in one embodiment. The top 703 is a positive contact, which can be coupled to the positive terminal 131 of the battery cell 100 by a single wire, in one embodiment. Therefore, a single wire can embed the cell monitor die into the battery cell 100. Advantageously, the cell monitor die 700 can be integrated in the top cap of the battery cell 100 in one embodiment, or in the center of the battery cell 100 in another embodiment.

Figure 8:
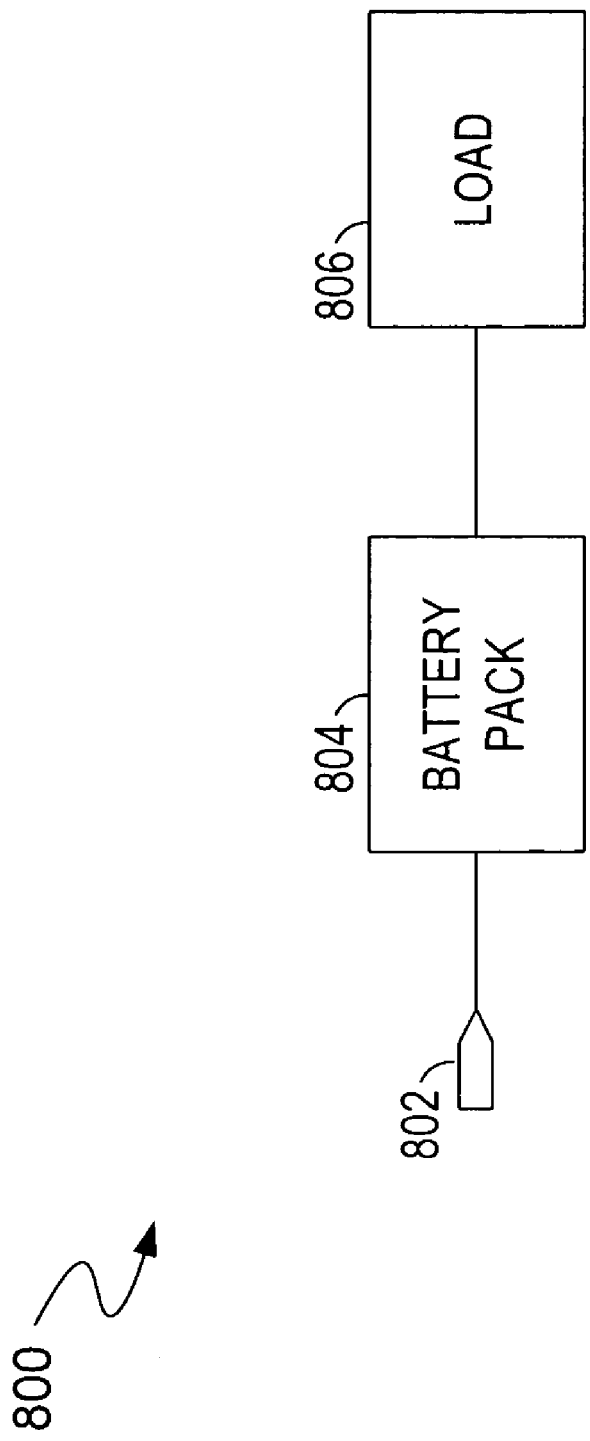
FIG. 8 illustrates a block diagram of an electronic system, in accordance with one embodiment of the present invention.

The battery pack 300 (400) can be used in many kinds of electronic systems. FIG. 8 illustrates an electronic system 800, such as an electronic vehicle, a computer, etc., in accordance with one embodiment of the present invention. In one embodiment, the electronic system 800 can include a battery pack 804 and a load 806 coupled to the battery pack 804. In one embodiment, the load 806 can include, but is not limited to, a vehicle motor, a computer system, etc. In one embodiment, the electronic system 800 includes an input terminal 802 that can be coupled to an adapter (not shown in FIG. 8 for purposes of brevity and clarity). The adapter can charge the battery pack 804 in a certain condition. The battery pack 804 can supply power to the load 806. In one embodiment, the battery pack 804 employs the configuration as shown in FIG. 3/FIG. 4. The battery pack 804 includes one or more battery cells, each of which is embedded with a cell monitor to monitor the battery cell. Therefore, the battery pack 804 can be monitored accurately and be protected from any undesirable conditions of each battery cell thereof, in one embodiment.

Figure 9:
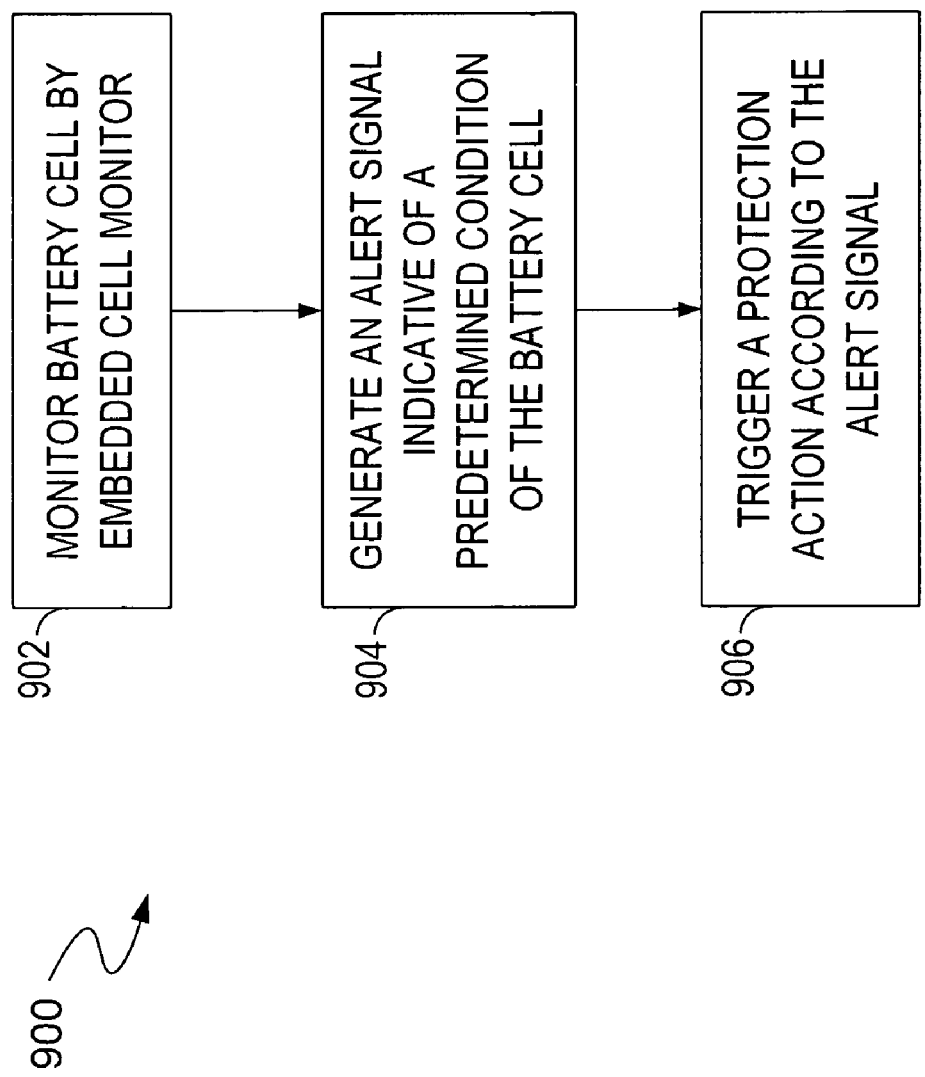
FIG. 9 illustrates a flowchart of operations performed by a battery system, in accordance with one embodiment of the present invention.

FIG. 9 illustrates a flowchart 900 of operations performed by a battery system, in accordance with one embodiment of the present invention. The battery system can employ the configuration as shown in FIG. 3/FIG. 4, in one embodiment. FIG. 9 is described in combination with FIG. 1, FIG. 2A, and FIG. 2B. In block 902, each battery cell in a battery pack is monitored respectively by a corresponding cell monitor 101 and thus an alert signal 191 indicative of a predetermined condition of the associated battery cell can be generated. The cell monitor 101 is embedded in each battery cell. In one embodiment, a temperature sensor 115 can monitor a temperature of the battery cell and thus the cell monitor 101 generates the alert signal 191 if the temperature of the battery cell is greater than a predetermined threshold. A voltage sensor 111 can monitor a voltage of the battery cell and thus the cell monitor 101 generates the alert signal 191 if the voltage of the battery cell is greater than a predetermined threshold. In block 904, the cell monitor 101 generates an alert signal 191 indicative of a predetermined condition of the battery cell. In one embodiment, the predetermined condition can be an undesirable condition (e.g., over-voltage and/or over-temperature condition). In block 906, a protection action (e.g., terminate battery charging/discharging) can be triggered according to the alert signal 191. In one embodiment, the battery cell can be disconnected from a load or a charger in response to the alert signal.

Figure 10:
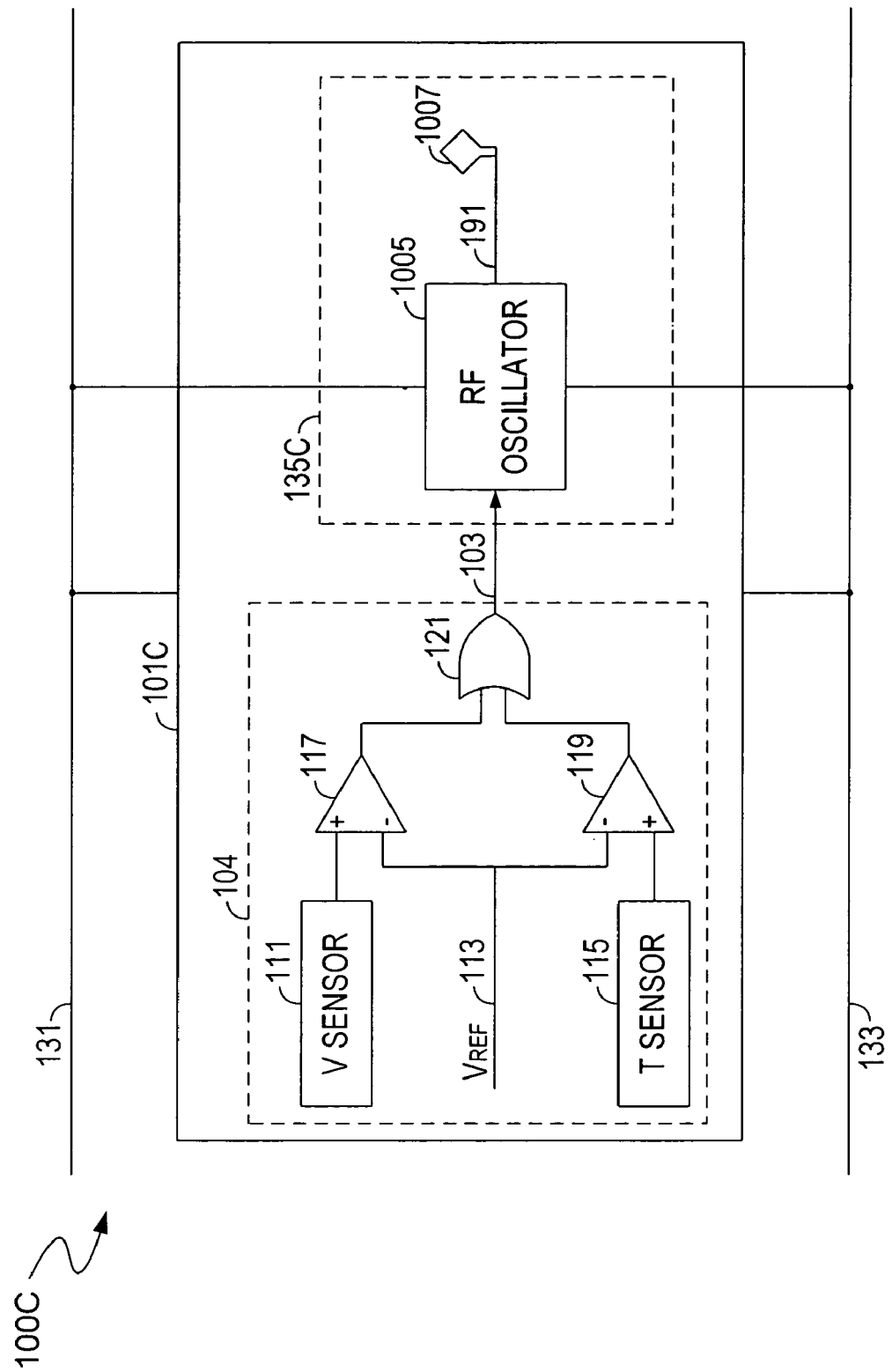
FIG. 10 illustrates a diagram of a battery cell with an embedded RF (radio frequency) cell monitor, in accordance with one embodiment of the present invention.

FIG. 10 illustrates another detailed diagram of a battery cell 100C with an embedded cell monitor 101C, in accordance with one embodiment of the present invention. Elements that are labeled the same as in FIG. 1, FIG. 2A and FIG. 2B have similar functions and will not be repetitively described herein for purposes of clarity and brevity. The exemplary sensing circuit 104 shown in FIG. 10 is for illustration, and other configurations can also be employed for the sensing circuit 104.

In one embodiment, the cell monitor 101C includes a transmitter 135C for receiving the detection signal 103 and for generating an alert signal 191 according to the detection signal 103. More specifically, the transmitter 135C includes a radio frequency (RF) oscillator 1005 and an antenna 1007 coupled to the oscillator 1005, in one embodiment. The antenna 1007 can be an RF loop antenna. The RF oscillator 1005 can be, but is not limited to, an RF single tone oscillator or an RF dual tone oscillator.

The RF oscillator 1005 can receive the detecting signal 103 from the logic OR gate 121. In one embodiment, the RF oscillator 1005 generates an oscillation signal, e.g., a sinusoidal AC waveform having a relatively high frequency, as the alert signal 191 according to the detecting signal 103. The antenna 1007 is operable for transferring the alert signal 191 to the battery cell 100C. As a result, when the voltage sensor 111 detects an over-voltage condition, and/or the temperature sensor 115 detects an over-temperature condition, an AC voltage with the frequency of the RF oscillator 1005 can be shown across the battery cell 100C in response to the alert signal 191.

As discussed above in relation to FIG. 1, the alert signal 191 can reflect an undesirable condition of the battery cell, e.g., an over-temperature and/or an over-voltage condition. Consequently, an AC voltage can be shown across the battery cell if an undesirable condition of the battery cell 100C is detected. Description will further be made with reference to FIG. 12 with respect to detecting the alert signal 191 and performing corresponding actions if an undesirable condition occurs.

Figure 11:
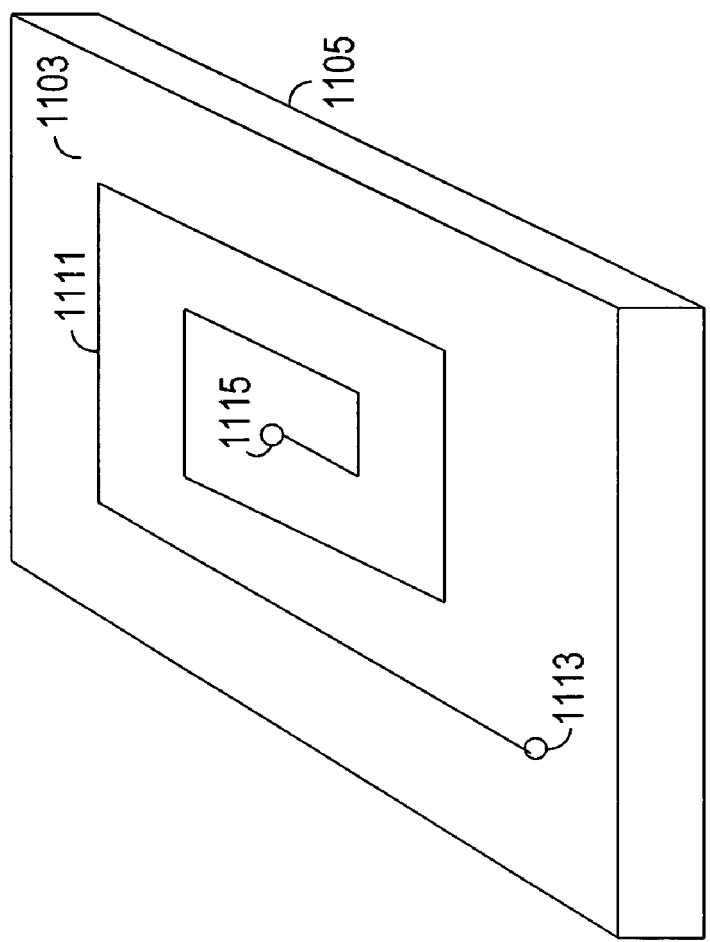
FIG. 11 illustrates an exemplary diagram of a die, in which an RF cell monitor is fabricated, in accordance with one embodiment of the present invention.

FIG. 11 illustrates an exemplary diagram of a die 1100, in which the cell monitor 101C is fabricated, in accordance with one embodiment of the present invention. The die 1100 includes a bottom 1105 (e.g., a substrate) and a top 1103. Because the bottom 1105 is ground, the bottom 1105 can be coupled to the negative terminal of the battery cell 100, in one embodiment. The top 1103 is a positive contact, which can be coupled to the positive terminal 131 of the battery cell 100 by a single wire, in one embodiment. The die 1100 can include a via 1113 and a via 1115. The via 1113 can be connected to the alert signal 191 in the transmitter 135C and the via 1115 can be connected to the ground, and vice versa. The die 1100 can include an antenna 1111 that is connected to the metal layer on the top 1103.

Figure 12:
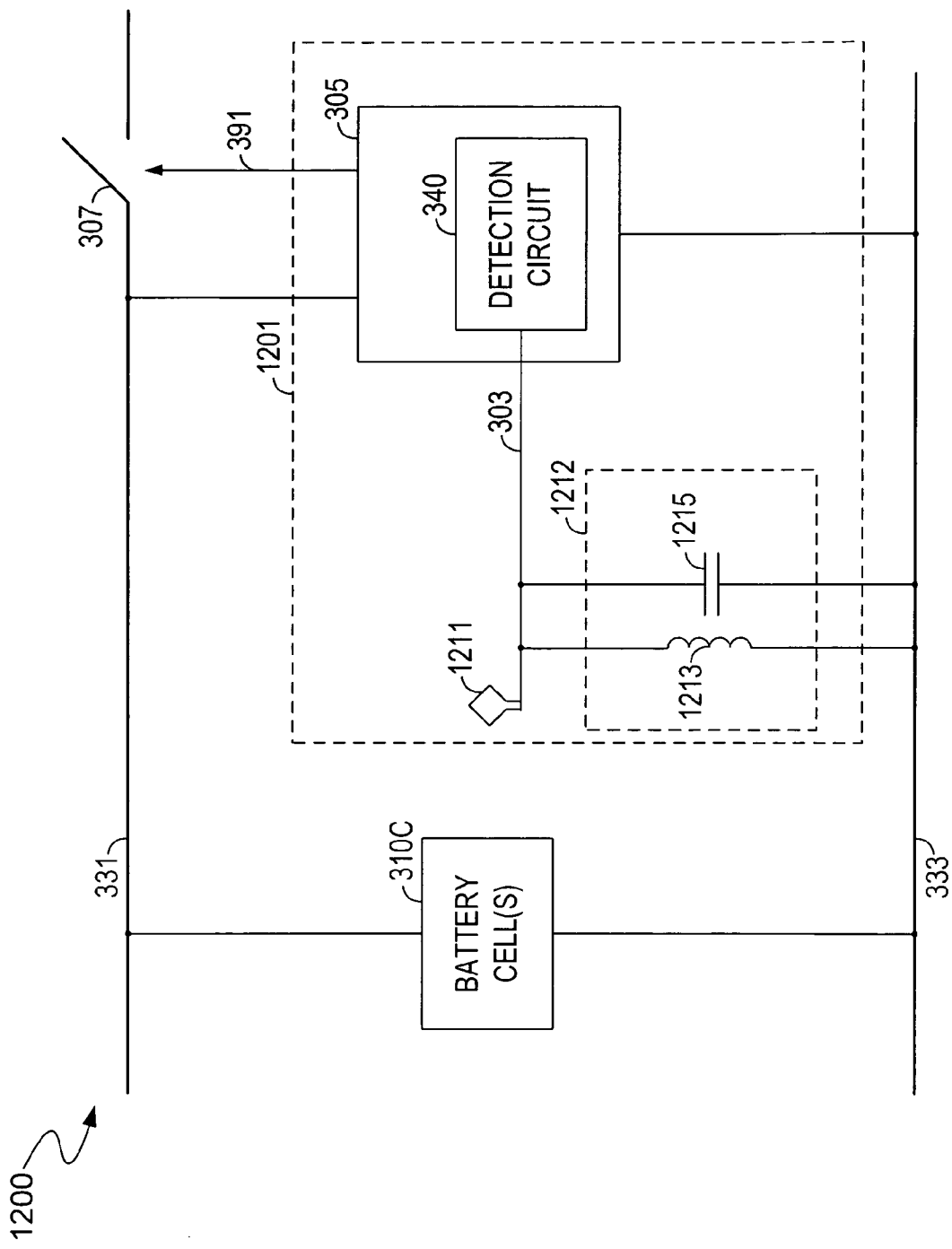
FIG. 12 illustrates a block diagram of a battery system, in accordance with one embodiment of the present invention.

FIG. 12 shows a block diagram of a battery system 1200 (e.g., a battery pack), in accordance with one embodiment of the present invention. Elements that are labeled the same as in FIG. 1, FIG. 3 and FIG. 4 have similar functions and will not be repetitively described herein for purposes of clarity and brevity.

The battery pack 1200 includes one or more battery cells 310C coupled in series and/or in parallel, each of which can employ the configuration in FIG. 10, in one embodiment. An RF cell monitor is embedded in each of the battery cells 310C.

Therefore, the battery cells 310C are monitored by the embedded RF cell monitors individually and respectively. The battery pack 1200 further includes a positive terminal 331, a negative terminal 333, a receiver 1201 and a switch 307, in one embodiment. The receiver 1201 can include an antenna 1211, a band-pass filter 1212, and a battery management unit 305. The switch 307 is controlled by the battery management unit 305. As described above in relation to FIG. 10, when an undesirable condition (e.g., an over-temperature condition and/or an over-voltage condition) is detected in a battery cell 100C, an AC voltage can be shown across the battery cell 100C in response to the alert signal 191. Thus, an AC voltage can be shown between the positive terminal 331 and the negative terminal 333 of the battery pack 1200, in one embodiment. The receiver 1201 can communicate with the antenna 1007 in the transmitter 135C via the antenna 1211 and is operable for receiving the alert signal(s) 191 from one or more RF cell monitors by detecting an AC voltage (e.g., a HF AC voltage) between the positive terminal 331 and the negative terminal 333 of the battery pack 1200, in one embodiment. A driving signal 303 can be generated according to the alert signal 191.

In one embodiment, the band-pass filter 1212 can include an inductor 1213 and a capacitor 1215 coupled in parallel for filtering noises associated with the battery pack 1200. The band-pass filter 1212 can generate the driving signal 303 according to the alert signal 191. The battery management unit 305 can receive the driving signal 303 from the band-pass filter 1212 and generate the switching signal 391 according to the driving signal 303. Corresponding actions can be performed to protect the battery pack 1200 in response to the switching signal 391. For example, the switching signal 391 turns off the switch 307 to terminate battery charging/discharging in order to prevent the battery pack 1200 from deterioration.

The battery pack 1200 can be used in many kinds of electronic systems, for example, the electronic system 800 in FIG. 8, in one embodiment. The battery system (e.g., the battery pack 1200) including embedded RF cell monitors can perform the operations shown in the flowchart 900 in FIG. 9, in one embodiment.

Accordingly, a battery pack is provided in the present disclosure. An RF cell monitor is embedded in each battery cell of the battery pack for monitoring the corresponding battery cell. When an undesirable condition (e.g., over-temperature condition and/or over-voltage condition) is detected in a battery cell, the corresponding RF cell monitor can generate an alert signal to the battery pack. A receiver in the battery pack can receive the alert signal and generate a driving signal to a battery management unit. The battery management unit can take corresponding actions, e.g., disabling the connection between the battery pack and other circuitry, to protect the battery pack from being deteriorated in the undesirable condition.

As disclosed hereinabove, each battery cell in a battery pack includes an RF cell monitor for monitoring a corresponding battery cell individually and respectively. Once an undesirable condition is detected by an RF cell monitor in the corresponding battery cell, the battery pack can be notified about the undesirable condition. Thus, the cell monitoring can be relatively accurate and the speed of responding to the undesirable condition can be relatively quick.

The embodiments that have been described herein, however, are some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A battery pack comprising:
a battery cell; and
a radio frequency (RF) cell monitor embedded in said battery cell and operable for monitoring said battery cell and for generating an alert signal indicative of a predetermined condition of said battery cell, wherein said RF cell monitor comprises:
a sensing circuit operable for detecting said predetermined condition of said battery cell and for generating a detecting signal; and
a transmitter operable for receiving said detecting signal and for generating said alert signal according to said detecting signal from said sensing circuit, wherein said transmitter comprises:
an RF oscillator operable for receiving said detecting signal and for generating said alert signal according to said detecting signal; and
an antenna coupled to said RF oscillator and operable for transferring said alert signal to said battery pack.

2. The battery pack of claim 1, wherein said RF cell monitor comprises a temperature sensor operable for monitoring a temperature of said battery cell, and wherein said RF cell monitor generates said alert signal if said temperature of said battery cell is greater than a predetermined threshold.

3. The battery pack of claim 1, wherein said RF cell monitor comprises a voltage sensor operable for monitoring a voltage of said battery cell, and wherein said RF cell monitor generates said alert signal if said voltage of said battery cell is greater than a predetermined threshold.

4. The battery pack of claim 1, further comprising:
a receiver coupled to a positive terminal and a negative terminal of said battery pack and operable for receiving said alert signal and for generating a switching signal according to said alert signal.

5. The battery pack of claim 4, wherein said receiver further comprises:
an antenna for receiving said alert signal;
a band-pass filter coupled to said antenna and for generating a driving signal according to said alert signal; and
a battery management unit operable for receiving said driving signal from said band-pass filter and for generating said switching signal according to said driving signal, wherein said switching signal triggers a protection action for said battery pack.

6. The battery pack of claim 5, wherein said battery management unit comprises:
a rectifier for receiving said driving signal and for generating a voltage signal; and
a comparator for comparing said voltage signal with a reference signal and for generating said switching signal according to a result of said comparison.

7. An electronic system comprising:
a load; and
a battery pack operable for supplying power to said load, wherein said battery pack comprises:
a battery cell; and
a radio frequency (RF) cell monitor embedded in said battery cell and operable for monitoring said battery cell and for generating an alert signal indicative of a predetermined condition of said battery cell, wherein said RF cell monitor comprises:
- a sensing circuit operable for detecting said predetermined condition of said battery cell and for generating a detecting signal; and
- a transmitter operable for receiving said detecting signal and for generating said alert signal according to said detecting signal from said sensing circuit, wherein said transmitter comprises:
  - an RF oscillator operable for receiving said detecting signal and for generating said alert signal according to said detecting signal; and
  - an antenna coupled to said RF oscillator and operable for transferring said alert signal to said battery cell.

8. The electronic system of claim 7, wherein said RF cell monitor comprises a temperature sensor operable for monitoring a temperature of said battery cell, and wherein said RF cell monitor generates said alert signal if said temperature of said battery cell is greater than a predetermined threshold.

9. The electronic system of claim 7, wherein said RF cell monitor comprises a voltage sensor operable for monitoring a voltage of said battery cell, and wherein said RF cell monitor generates said alert signal if said voltage of said battery cell is greater than a predetermined threshold.

10. The electronic system of claim 7, further comprising:
- a receiver coupled to a positive terminal and a negative terminal of said batter battery pack and operable for receiving said alert signal and for generating a switching signal according to said alert signal.

11. The electronic system of claim 10, wherein said receiver further comprises:
- an antenna for receiving said alert signal;
- a band-pass filter coupled to said antenna and for generating a driving signal according to said alert signal; and
- a battery management unit operable for receiving said driving signal from said band-pass filter and for generating said switching signal according to said driving signal, wherein said switching signal triggers a protection action for said battery pack.

12. The electronic system of claim 11, wherein said battery management unit comprises:
- a rectifier for receiving said driving signal and for generating a voltage signal; and
- a comparator for comparing said voltage signal with a reference signal and for generating said switching signal according to a result of said comparison.

13. The electronic system of claim 9, where said load comprises a vehicle motor.

14. The electronic system of claim 9, wherein said load comprises a computer system.

15. A method for monitoring a battery pack, comprising:
- monitoring a battery cell in said battery pack by an radio frequency (RF) cell monitor which is embedded in said battery cell;
- generating a detecting signal according to a monitoring result;
- generating an alert signal indicative of a predetermined condition of said battery cell based upon said detecting signal by said RF cell monitor; and
- transferring said alert signal to said battery cell by an antenna.

16. The method of claim 15, comprising:
monitoring a temperature of said battery cell; and
generating said alert signal if said temperature of said battery cell is greater than a predetermined threshold.

17. The method of claim 15, comprising:
monitoring a voltage of said battery cell; and
generating said alert signal if said voltage of said battery cell is greater than a predetermined threshold.

18. The method of claim 15, comprising:
triggering a protection action for said battery pack according to said alert signal.

* * * * *